(12) United States Patent
Cau

(10) Patent No.: US 7,043,797 B2
(45) Date of Patent: May 16, 2006

(54) HINGE RETARDING DEVICE SUCH AS FOR VEHICLE GLOVE COMPARTMENT LIDS

(75) Inventor: Pietro Cau, Turin (IT)

(73) Assignee: I.T.W Fastex Italia S.p.A., Strada Settimo (IT)

( * ) Notice: Subject to any disclaimer, the term of this patent is extended or adjusted under 35 U.S.C. 154(b) by 0 days.

(21) Appl. No.: 10/315,109

(22) Filed: Dec. 10, 2002

(65) Prior Publication Data

US 2003/0079312 A1 May 1, 2003

Related U.S. Application Data

(63) Continuation-in-part of application No. 09/296,400, filed on Apr. 23, 1999, now abandoned.

(30) Foreign Application Priority Data

Apr. 24, 1998 (IT) .............................. TO98A0355

(51) Int. Cl.
*E05F 1/14* (2006.01)
(52) U.S. Cl. .............................. 16/285; 16/342; 16/281
(58) Field of Classification Search .................. 16/285, 16/75, 76, 54, 50, 82, 85, 304, 281, 235, 16/273, 277, 280, 342, 337; 192/223.4; 188/67 Y, 166, 196 F; 267/154, 287, 291; 296/37.12, 146.8; 49/386, 339, 340
See application file for complete search history.

(56) References Cited

U.S. PATENT DOCUMENTS

| 4,097,958 A | | 7/1978 | Van Dell | |
| 4,828,236 A | * | 5/1989 | Inoue | ......................... 267/182 |
| 4,911,268 A | | 3/1990 | Kulpa | |
| 5,000,057 A | | 3/1991 | Tseng | |
| 5,041,818 A | | 8/1991 | Liu | |
| 5,064,137 A | | 11/1991 | Komatsu | |
| 5,173,837 A | * | 12/1992 | Blackwell et al. | .......... 361/681 |
| 5,197,704 A | | 3/1993 | Kiamura | |
| 5,318,161 A | | 6/1994 | Lyga | |
| 5,354,028 A | | 10/1994 | Kitamura | |
| 5,393,160 A | * | 2/1995 | Ojima | ........................ 403/120 |
| 5,470,040 A | * | 11/1995 | Bhagat et al. | ......... 248/222.11 |

(Continued)

FOREIGN PATENT DOCUMENTS

JP   5-32660   4/1993

(Continued)

*Primary Examiner*—Brian E. Glessner
*Assistant Examiner*—Mark Williams
(74) *Attorney, Agent, or Firm*—Lowe Hauptman & Berner, LLP

(57) ABSTRACT

A retarding device insertable between two members connected to rotate relatively about a hinge axis, and which opposes and so retards such rotation in predetermined manner; the device having: a substantially cylindrical support carried integrally by a first of the rotationally connected members and substantially coaxial with the hinge axis; a coil, spring fitted interferentially to the support and terminating with two opposite radial arms projecting towards a second of said members connected to each other for relative rotation; and a retaining seat carried integrally by the second member and on which the arms of the spring rest, on opposite sides, and are stressed by the second member, as a consequence of the aforementioned relative rotation, to deform the spring in such a direction as to progressively reduce and, beyond a certain point of the moving path of the other member, substantially eliminate, the interference with which the spring is fitted to the support. The rotation of the rotationally connected members is broken in a predetermined manner.

2 Claims, 1 Drawing Sheet

U.S. PATENT DOCUMENTS

| | | |
|---|---|---|
| 5,542,505 A | 8/1996 | Kempf |
| 5,564,163 A | 10/1996 | Lowry et al. |
| 5,608,604 A | 3/1997 | Francis |
| 5,784,759 A | 7/1998 | King |
| 5,829,814 A | 11/1998 | Niessner et al. |

FOREIGN PATENT DOCUMENTS

| | | |
|---|---|---|
| JP | 59-185275 | 10/1999 |

* cited by examiner

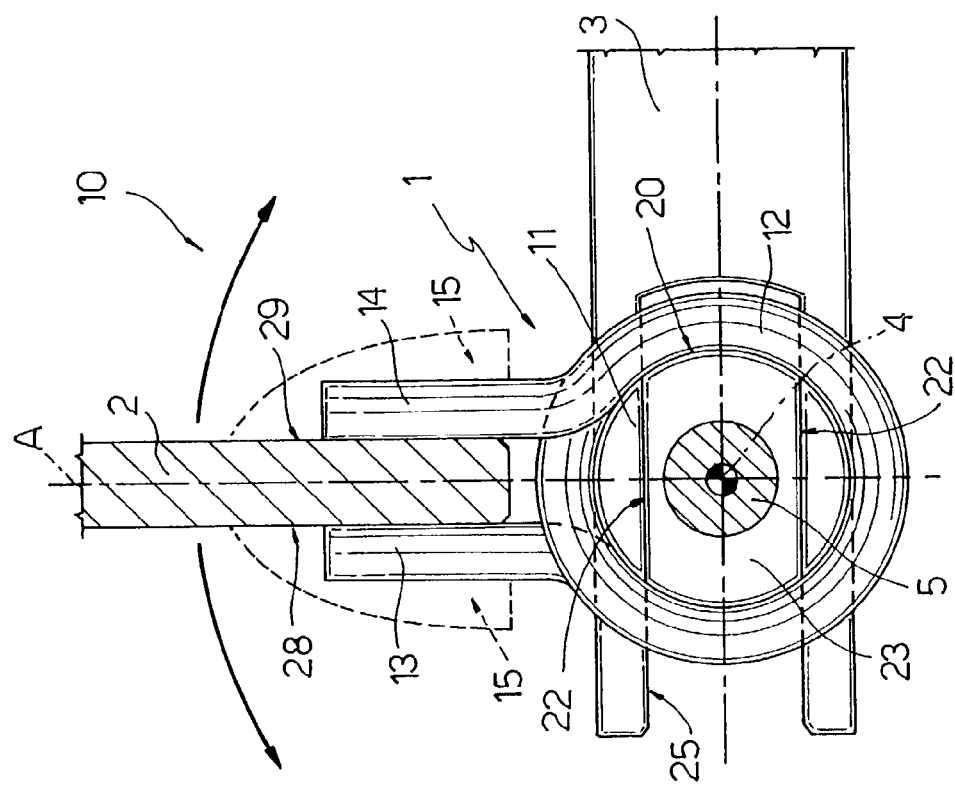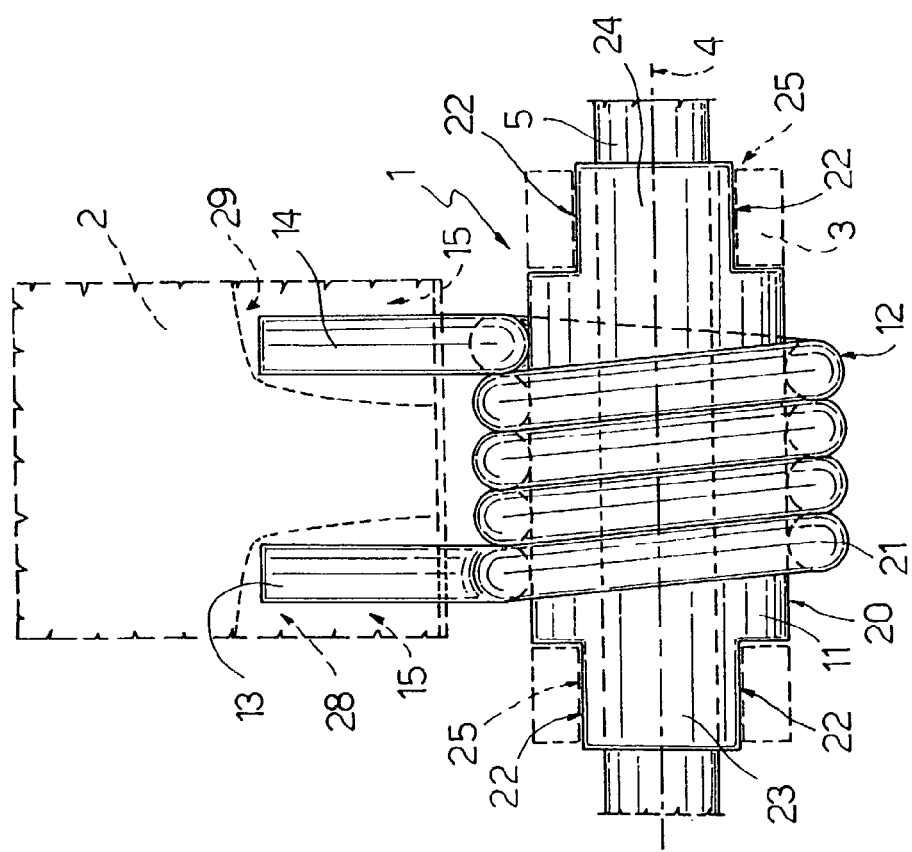

ial rotation of two members to maintain rotation below a predetermined speed. One of the most common examples is a vehicle glove compartment lid. For example, when the lock is clicked open, some lids are opened automatically by a spring, which is loaded when the lid is pushed shut by the user; in which case, the retarding device prevents the lid from springing open violently. In other cases, the lid is lifted open by the user and clicked into a limit position, normally defined by a stop mechanism; in which case, the retarding device prevents the lid from dropping down sharply into the closed position (under its own weight and/or by the thrust exerted by a contrast spring) when the stop mechanism is released.

HINGE RETARDING DEVICE SUCH AS FOR VEHICLE GLOVE COMPARTMENT LIDS

This is a continuation in part of Ser. No. 09/296,400, filed Apr. 23, 1999, now abandoned.

The present invention relates to a hinge retarding device, in particular for vehicle glove compartment lids. More generally, the retarding, device according to the invention is suitable for insertion between any two relatively rotating members to brake rotation of the members in controlled manner.

BACKGROUND OF THE INVENTION

Some applications call for retarding the relative rotation of two members to maintain rotation below a predetermined speed. One of the most common examples is a vehicle glove compartment lid. For example, when the lock is clicked open, some lids are opened automatically by a spring, which is loaded when the lid is pushed shut by the user; in which case, the retarding device prevents the lid from springing open violently. In other cases, the lid is lifted open by the user and clicked into a limit position, normally defined by a stop mechanism; in which case, the retarding device prevents the lid from dropping down sharply into the closed position (under its own weight and/or by the thrust exerted by a contrast spring) when the stop mechanism is released.

The above problems are currently solved using retarding devices which are either fitted to the hinges or connected to the moving member, and which provide, in a controlled manner, for braking rotation either in both (open and closed) directions or only in, the direction of sharp or accelerated movement which might endanger the safety of the user. Retarding devices are substantially of two types. A first type comprises a friction mechanism (normally mechanical) normally having facing spring-loaded friction members which rub against each other during the movement to be retarded, so that part of the energy produced during the movement must overcome the friction between the friction members, thus greatly reducing the force applied to, and acceleration of, the moving member. A second type comprises a hydraulic mechanism in which one or more gears, connected to the moving member to be braked, are immersed and rotated in a thick fluid (e.g., silicone oil).

Retarding devices of both above types have numerous drawbacks: both are expensive and bulky, and neither can be integrated with the hinge structure. Moreover, friction devices are mechanically complex, not always reliable, and subject to wear; while hydraulic devices are subject to leakage, and, above all, vary in performance according to ambient temperature (which affects the density of the oil and hence the extent to which the movement is retarded).

SUMMARY OF THE INVENTION

It is an object of the invention to provide a retarding device which is straightforward and inexpensive to produce, extremely compact, may be integrated with a hinge, is reliable, and unaffected by variations in ambient temperature. According to the present invention, there is provided a retarding device insertable between two members connected to rotate relatively about a hinge axis.

The device is designed to oppose and retard such rotation in predetermined manner, and includes:

a substantially cylindrical support carried integrally by a first of the rotationally connected members and is substantially coaxial with the hinge axis. A coil spring is interference fitted to the support and terminating with two opposite radial arms projecting towards a second of the rotationally connected said members. A retaining seat is carried integrally by the second member and on which the arms of the spring rest, on opposite sides, and are stressed by the second member, as a consequence of relative rotation of said members about the hinge axis, to deform the spring in such a direction as to progressively reduce and, beyond a certain point of the moving path of said other member, substantially eliminate the interference with which the spring is fitted to the support. Rotation of the rotationally connected members is broken in a predetermined manner.

More specifically, the spring is fitted to a cylindrical lateral surface of a pin having a diameter greater than the inside diameter of the spring when undeformed. The pin is fitted to the first member by a prismatic joint preventing rotation of the pin with respect to the first member.

Consequently, when the two members are rotated relatively, one or the other (depending on the direction of relative rotation) of the two arms of the spring, which rest laterally on respective opposite faces of the retaining seat parallel at all times to the tangents to the lateral surface of the pin, is subjected to a torque reaction which tends to elastically increase the winding diameter of the spiral defined by the coil spring.

When relaxed, the spring may therefore also be rotated with respect to the pin, but very slowly due to the strong internal friction produced by the elastic deformation, so as to retard relative rotation of the two members as required. The braking action is proportional to the diameter of the music wire from which the spring is made, and to the ratio between the inside diameter of the turns of the spring at rest and the outside diameter of the pin to which the spring is fitted, i.e. to the amount of interference.

The device according to the invention is therefore extremely straightforward and inexpensive to produce, easy to assemble (by simply inserting the spring with a tool and fitting the spring onto the pin by deformation), active in both rotation directions, and compact and integrated easily with the hinge. The braking action is unaffected by ambient temperature, there are no leakage problems, and operation is fully reliable.

The pin to which the spring is fitted need not, of course, necessarily be cylindrical, and may be prismatic, oval or elliptic, providing the shape permits deformation and rotation of the spring.

BRIEF DESCRIPTION OF THE DRAWINGS

A non-limiting embodiment of the present invention will be described by way of example with reference to the accompanying drawings, in which:

FIG. 1 is a schematic elevation of a retarding device in accordance with the invention and integrated with a hinge; and FIG. 2 is a cross section of the FIG. 1 device and hinge.

DETAILED DESCRIPTION OF THE INVENTION

Retarding device 1 in FIGS. 1 and 2 is insertable between two members 2, 3 connected to rotate relatively about a hinge axis 4, and which, as will be seen, opposes and so retards rotation of the members in a predetermined manner. Members 2, 3 may be any two members movable with respect to each other, e.g., a lid closing an access opening (e.g., to a vehicle glove compartment) and a post defining said opening, or may form part of a hinge device 10 (FIG. 2) hinging the members and integrated with retarding device 1, in which case, members 2, 3 are defined by two half-hinges (e.g., a movable and a fixed half-hinge) connected by a pin 5 to rotate about hinge 15 axis 4.

According to the invention, device 1 comprises a support 11 carried integrally by one of members 2, 3 (in the example shown, member 3) and is substantially coaxial with hinge axis 4. A coil spring 12 is interference fitted to support 11 and terminates with two opposite radial arms 13, 14 projecting towards the other member (in the example shown, member 2); and at least one retaining seat carried integrally by member 2, and on which arms 13, 14 of spring 12 rest on opposite sides.

In the non-limiting example shown, member 2 is assumed to be the movable member (rotating about axis 4), and member 3 the fixed member, though the following description also applies conversely. Moreover, though support 11, in the non-limiting example shown, is defined by a substantially cylindrical pin defined by a 5 cylindrical outer lateral surface 20 coaxial with axis 4, it is understood that any support of substantially axial extension and symmetry may perform the same function as cylindrical pin 11.

According to the invention, spring 12 is interference fitted to cylindrical surface 20 and is made from circular-section music wire of a predetermined diameter, by winding the wire into a coil (defining spring 12) defined by a number of turns and having an inside diameter, when undeformed, smaller than the outside diameter of pin 11 at surface 20.

According to the invention, pin 11 is fitted integrally and connected angularly to member 3 by prismatic joints defined by circumferential flat surfaces 22 formed on respective opposite ends (e.g., 23) 24 of pin 11, which are fitted inside respective complementary prismatic seats 25 formed integrally in member 3. Pin 11 is preferably molded in one piece from plastic material, or may be made of metal.

Arms 13 and 14 are defined by respective bent ends of spring 12, which rest laterally—each without crossing the plane of member 2 (indicated A in FIG. 2)—on respective opposite faces 28, 29 of retaining seat/s 15 (FIG. 2). In the simplest embodiment, retaining seat 15 for both arms 13, 14 is defined simply by faces 28, 29, which also define member 2 as a whole. Alternatively, provision may be made for one or more seats 15 (shown schematically by the dash lines) comprising, for example, concavities or appropriate deformations of member 2 and defined partly by faces 28, 29.

Whichever the case, according to the invention, faces 28, 29 are so formed as to be parallel at all times to the tangents to lateral outer surface 20 of pin 11, so as to rotate relatively about axis 4 in either of the two directions indicated by the arrows in FIG. 2, whenever members 2 and 3 are rotated relatively. As such, in the case of clockwise rotation, face 29 intercepts and rotates arm 14, and face 28 does the same with arm 13 in the case of anticlockwise rotation.

In the example shown, the two rotationally connected members 2, 3 defining hinge device 10 are connected to each other by pin 5, which is fixed to and angularly integral in known manner with member 2 (as shown by the hatching in the same direction in FIG. 2) and also defines hinge axis 4. Pin 5 is fitted coaxially through pin or support 11, which is therefore tubular, substantially cylindrical, and free to rotate with respect to pin 5, or to remain stationary with member 3 as member 2 rotates. The same result is achieved if pin 5 is also fixed (e.g. forms an integral part of pin 11) and member 2 is connected idly to pin 5 by appropriate seats.

Whichever the case, by virtue of the structure 5 described, retarding device 1 (and retarded hinge device 10 as a whole) operates as follows.

Normally, spring 12 is wound tightly about pin 11, thus preventing any rotation between the two.

When member 2, either acted on manually by the user, by virtue of the thrust exerted by elastic means, or under its own weight, begins rotating about axis 4 in either of the two directions shown by the arrows in FIG. 2, it stresses one of arms 13, 14, which, at rest, rests against opposite faces 28, 29 which, for the reasons described, rotate integrally with member 2. Consequently the arm 13, 14 involved (depending on the rotation direction) is subjected by member 2 to a torque reaction, which is directly proportional to the rotation angle, and which elastically increases the winding diameter of the spiral defined by coil spring 12.

In other words, the torque transmitted to arms 13, 14, whichever the direction of rotation, tends to elastically deform spring 12 in such a direction as to reduce the interference with which the spring is fitted to support 11, so that the spiral formed by spring 12 "opens" to enable spring 12 to rotate with respect to pin 11 and together with member 2. However, the energy required to elastically deform spring 12 sufficiently to enable the spring to rotate dissipates a large part of the energy acting on member 2, so that rotation of member 2 is retarded in direct proportion to the initial interference and the elastic twisting force absorbed by the spring (depending on the diameter of wire 21) during deformation.

The spring 12 opens to such an extent that there is no interfering contact between the spring and the lateral surface 20 of the hinge shaft, allowing the member 2 to rotate freely about hinge axis 4. In this manner, the member 2 is able to move into contact against the stationary member 3 by quickly completing the closing path of the member 2, e.g., completing the closing path of the door of a glove compartment.

During the motion of the member 2 caused by force, e.g., externally applied or spring-loaded, the force applied to spring 12 is caused by the force applied, i.e., transmitted through the arms 13, 14, but also by gravity acting on the member 2 which is also transmitted through arms 13, 14. Depending on the angular position of the moving member 2, a similar weight member 2 may exert a different torque depending on its angular position. That is, if the member 2 is vertically oriented with respect to hinge axis 4, the center of gravity passes substantially through the hinge and substantially no torque is applied. If the member is horizontal with respect to hinge axis 4, the center of gravity passes at the maximum distance from the hinge axis and the maximum torque is exerted by the weight of the cover on the spring 12.

The same principle, according to, a variation not shown, could also be applied in reverse, e.g., by housing a coil spring interferentially inside a cylindrical seat from which the arms project, and by connecting the arms to the movable member so that, during relative rotation, the arms subject the spring to such a torque as to elastically close (i.e., reduce the diameter of) the spiral. Clearly, however, the preferred embodiment described is much easier to assemble.

The invention claimed is:

1. A vehicle compartment hinge retarding device insertable between two rotationally connected members connected to rotate relatively only about a single hinge axis; the rotationally connected members forming a vehicle compartment hinge; said device being configured to oppose and retard such rotation in a predetermined manner and comprising:

a substantially cylindrical support carried integrally by one of the rotationally connected members and being substantially coaxial with the hinge axis;

a coil spring interference fitted to the support and terminating with two opposite radial arms protecting towards the other of the rotationally connected members; and a retaining seat carried integrally by said other member and on which seat the arms of the spring rest, on opposite sides thereof, and are stressed by said other member;

wherein said spring is configured to deform upon relative rotation of said members about said hinge axis so as to progressively reduce and, beyond a certain point of the moving path of said other member, completely eliminate the interference with which said spring is fitted to the support; and the two rotationally connected said members are connected to each other by a pin defining said hinge axis and inserted coaxially through said substantially cylindrical support.

2. The device as claimed in claim 1, wherein said support is freely rotatable about said pin.

* * * * *